July 14, 1936.  J. J. LAWLOR  2,047,209
MOLDING MACHINE
Filed Dec. 14, 1933  2 Sheets-Sheet 1

INVENTOR.
JOHN J. LAWLOR
BY
ATTORNEY.

July 14, 1936. J. J. LAWLOR 2,047,209
MOLDING MACHINE.
Filed Dec. 14, 1933 2 Sheets-Sheet 2
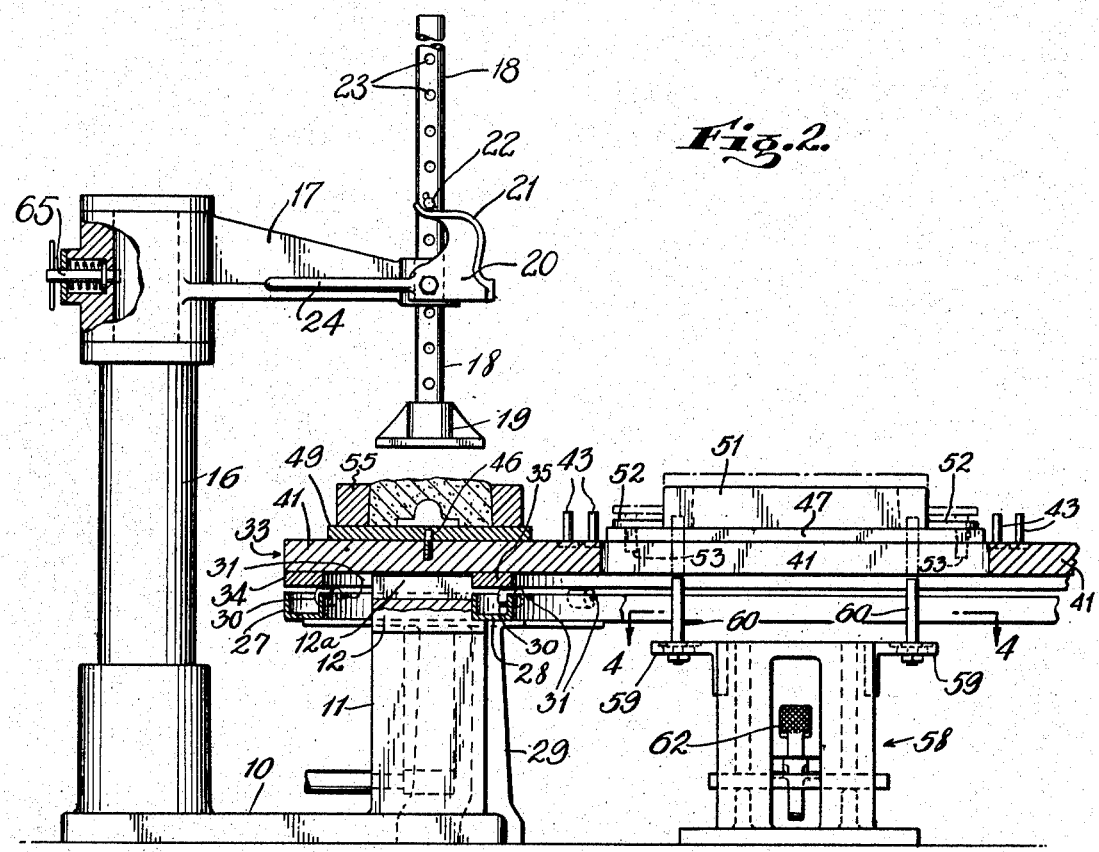
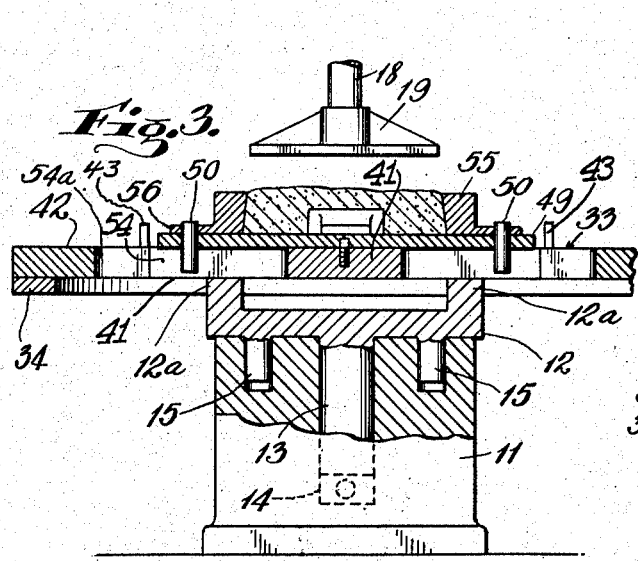
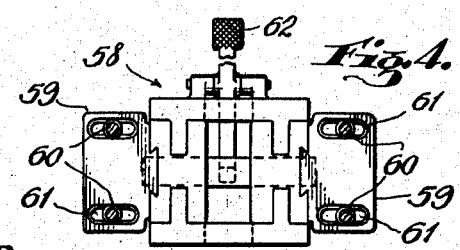
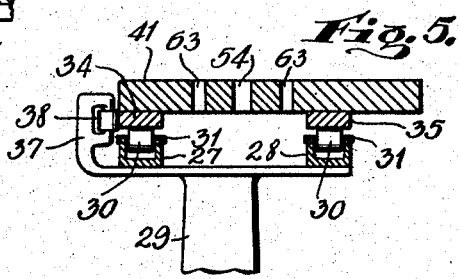
INVENTOR.
JOHN J. LAWLOR
BY
ATTORNEY.

Patented July 14, 1936

2,047,209

UNITED STATES PATENT OFFICE 2,047,209

MOLDING MACHINE

John J. Lawlor, Plainfield, N. J., assignor to General Foundry Machinery Corporation, a corporation of Delaware Application December 14, 1933, Serial No. 702,275

13 Claims. (Cl. 22—21)

The present invention relates to improvements in mold making machinery.

The invention is more particularly adapted for making a plurality of molds from the same pattern and it has for an object to provide a continuous system of mold manufacture, wherein each mold undergoes a cycle of operations, but in which the operations are simultaneously carried out on different molds.

A more specific object of the invention is to provide a machine in which the assembly of a mold, the jarring and ramming of sand in the mold, and the stripping of the mold from the pattern are preformed at different stations, while a conveyor carries a series of mold parts successively through said stations. In a preferred embodiment of my invention the conveyor has the form of a turntable which is operable by hand to convey the mold parts from station to station.

With these objects in view and others which will appear hereinafter I shall now describe a preferred embodiment of my invention and thereafter the novelty and scope of the invention will be pointed out in the claims.

In the accompanying drawings:

Fig. 2 is a fragmental view in vertical section taken on the line 2—2 of Fig. 1;

Fig. 3 is a detail view in vertical section taken substantially on the line 3—3 of Fig. 1;

Fig. 4 is a view in section taken on the line 4—4 of Fig. 2, being substantially a plan view of the stripper mechanism; and Fig. 5 is a fragmental view in section taken on the line 5—5 of Fig. 1.

Figure 1:
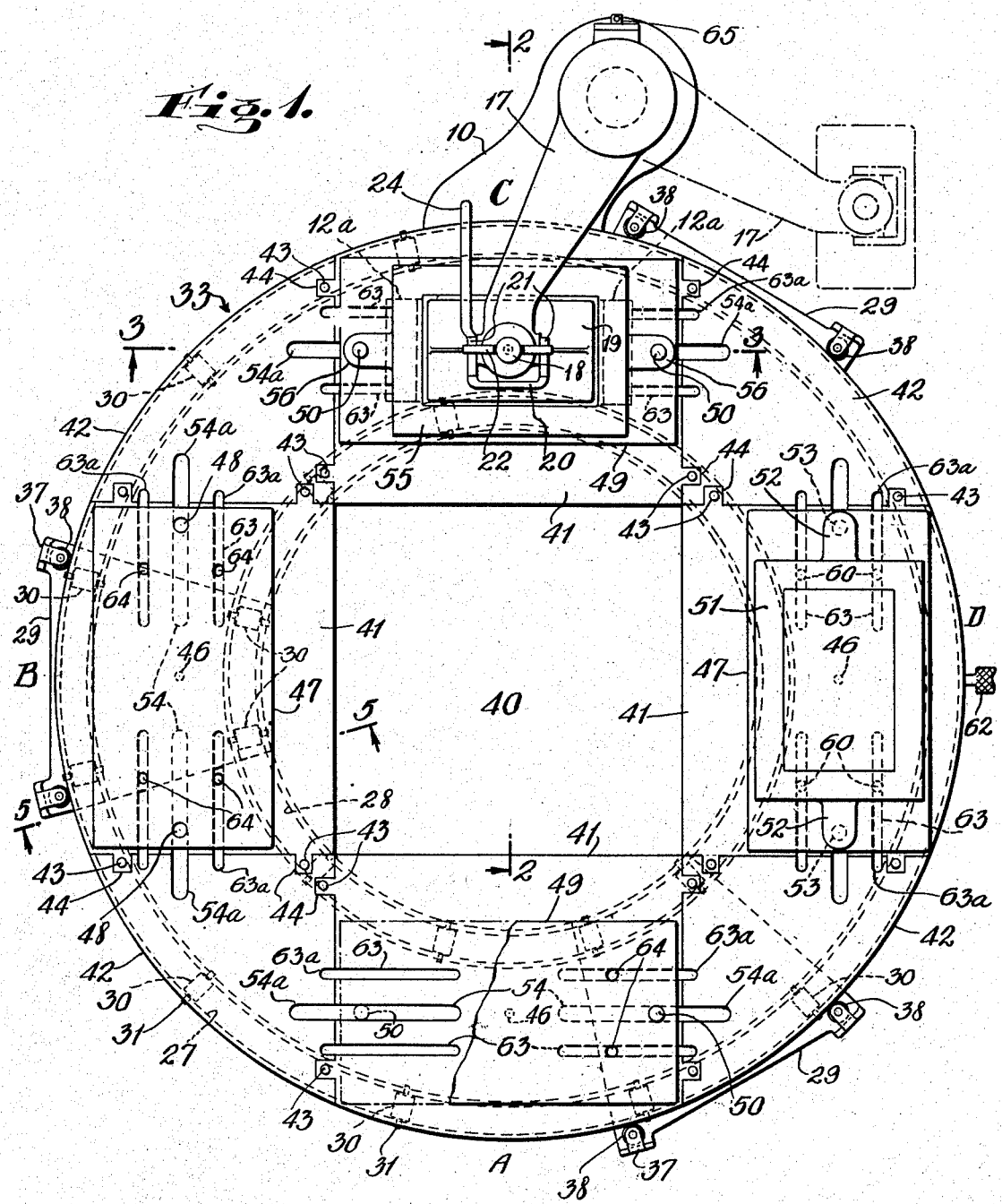
Fig. 1 is a plan view of my improved molding machine.

In general my improved molding machine comprises a jarring mechanism and a stripping mechanism located in predetermined spaced relation, with a common conveyor serving both of these mechanisms. The jarring mechanism shown in the drawings comprises a main frame 10 from which rises a trunk 11. A jarring head 12 carried by a plunger 13 is fitted to slide in a bore or working chamber 14 formed in the trunk. Guide pins 15 extend downwardly from the head 12 into suitable sockets formed in the trunk, to keep the head 12 from turning. By means of suitable valve mechanism of standard form (not shown) a pulsating air pressure is produced in the chamber 14 so as to cause the head 12 to reciprocate vertically.

Adjacent the trunk 11 there is a column 16 which rises from the base 10. Pivotally mounted on this column is an arm 17 which overlies the jarring head 12. Projecting through a vertical opening in the outer end of the arm is the stem 18 of a rammer 19. Pivotally mounted on the end of the arm 17 is a yoke 20 formed with cam-shaped wings 21 adapted to engage a pin 22 which is inserted through one of a series of openings 23 formed in the stem 18. A handle 24 is secured to the yoke 20. The rammer is adapted to rest on the sand in a flask section while the jarring head 12 is operating, and the pin 22 is set in such position that by swinging the handle 24 to the horizontal position shown in Fig. 2, the cams 21 will lift the rammer clear of the work.

A rotary conveyor table is mounted to turn on a frame which comprises a pair of concentric annular beams 27 and 28 of channel section. These beams are supported on pedestals 29, there being three of these pedestals used in the particular embodiment illustrated. Rollers 30 are disposed radially in these channels, having journals 31 which turn in slots formed in the flanges of the channel beams.

The table itself which is generally indicated by the reference numeral 33, is provided with a pair of annular concentric rails 34 and 35 which run on the rollers 30. Each pedestal is provided with a bracket 37 in which vertical rollers 38 are mounted. These rollers bear against the outer periphery of the rail 34, thereby confining the table against lateral dispersement.

The top of the table 33 has a circular outer periphery preferably coinciding with that of the outer rail 34. For the purpose of reducing weight a large square opening 40 is formed at the center of the table. The table top is subdivided into eight sections, comprising four main plates 41 which are of substantially rectangular form except for their outer arcuate margins, and four sector-shaped plates 42 which fill in the corners between the main plates 41. The plates 42 are fixed to and connect the rails 34 and 35 but the plates 41 are adapted to reciprocate vertically.

In order to guide the plates 41 in their vertical reciprocation, pins 43 project from the plates 42 and enter holes in lugs 44 projecting laterally from the plates 41. Normally the lugs are seated in recesses formed in the plates 42 so that they will lie flush with the surface of the table top. As shown in Fig. 3, the jarring head 12 is provided with a pair of vertical end flanges 12a which pass between the rails 34 and 35, to contact with the plates 41 during the jarring operation.

Each plate 41 is adapted to carry a pattern plate and a flask section over the jarring head 12 and under the rammer 19. To this end each plate 41 is provided with a centering pin 46 adapted to enter a central socket in the bottom of the pattern plate. Preferably a slightly different pattern plate is used for the cope from that used for the drag. The difference lies in the fact that the drag pattern plate 47 has apertures 48 near opposite ends thereof, whereas the cope pattern plate 49 has dowel pins 50 near opposite ends thereof, these pins projecting from the opposite faces of the plate. The drag section 51 of the flask is provided with lugs 52 at each end formed with depending dowel pins 53 which are adapted to pass through the apertures 48 of the drag pattern plate and project into slots 54 in the table plates 41. These slots are also extended into the plates 42, as indicated at 54a, so as to accommodate pattern plates and flask sections of larger sizes. It will now be evident that with the center pin 46 engaging the drag pattern plate and the pins 53 doweling the drag to the drag pattern plate and also engaging the slots 54 the mold parts will be fixed against any lateral displacement and may therefore be brought to proper position with relation to the jarring mechanism. The cope section 55 of the flask also has projecting lugs 56 at each end, but these lugs are formed with holes to receive the pins 50 projecting from the cope pattern plate 49. The cope parts are properly centered on the table plates 41 because, as shown in Fig. 3, the pins 50 project downwardly and engage the slots 54 or 54a, as the case may be.

Disposed at an angle of 90 degrees from the jarring mechanism is stripper mechanism 58, so that while one flask section is centered over the jarring head, as indicated in Fig. 1, the next flask section to the right will be centered over the stripper. The latter has a vertically slidable stripper head 59 from which project pins 60. These pins are adjustable in slots 61 formed in the stripper head. By means of suitable mechanism, the details of which are not shown because they correspond to standard practice, the stripper head 59 may be raised upon depressing a pedal 62. The pins 60 then pass through slots 63 in the table plates 41 and also through openings 64 formed in the pattern plates to engage the end walls of the flask section and lift the same off the pattern. If necessary to accommodate larger molds the slots 63 may also be extended into the table plates 42, as indicated at 63a.

The operation of the machine may now be described as follows: Referring to Fig. 1, it will be noted that there are four operating stations indicated by the letters A, B, C, and D. Every other plate 41 bears a drag pattern plate 47 while intervening plates 41 bear cope pattern plates 49. As illustrated in Fig. 1, there is a cope pattern plate 49 at station A and a drag pattern plate 47 at station B. An operator at station B places a drag section of a flask over the pattern plate 47 with the pins 53 of the drag section passing through the holes 48 in the pattern plate and engaging the slots 54 in the plates 41, or, if the mold is too long to be accommodated within the confines of the plate 41 said pins will project into the slot extension 54a of the adjacent plates 42. After the flask section has been properly positioned on the pattern plate, it is filled with sand and then the table is turned manually through an angle of 90 degrees to bring the filled flask section to the station C. The handle 24 is now operated to drop the rammer 19 upon the sand in the flask and then the jarring mechanism is operated to reciprocate the jarring head 12 vertically and thereby jar the flask. During this operation, the rammer 19 is jarred with the flask and by reason of its inertia it tends to ram and pack the sand tightly in the flask. As soon as the jarring operation is completed the rammer is raised clear of the work and the table is then turned through another angle of 90 degrees to bring the flask section over the stripper 58. Here surplus sand is struck off the drag and a "bottom board" is clamped thereon in the usual manner, after which the pedal 62 is operated to lift the drag section off the pattern. Then the operator removes the drag, inverts it, and places it on a suitable adjacent table (not shown). In the meantime, the cope pattern plate 49 has been carried progressively from station A to station B and then to station C. At station B a cope flask section was fitted upon the plate 49 with the pins 50 projecting through the apertured lugs 56, and the cope was filled with sand. While the stripper was being operated to strip the drag from the pattern, the cope section was being jarred. When the table is moved through the next step of 90 degrees, the cope section is centered over the stripper. Here the pouring gates are formed in the mold and the pedal 62 is then operated to lift the cope off its pattern plate, after which the cope is conveyed to said adjacent table where it is placed without inverting it upon the drag, with the upwardly projecting dowel pins 53 of the drag fitting into the openings in the lugs 56 of the cope. Thus, the work proceeds, with a mold section being stripped while the next succeeding section is being rammed or jarred and while the second succeeding section is being assembled and filled. If desired, assembly of the mold sections may take place not only at station B but also at station A, or, if desired, the sections may all be assembled at station A and filled with sand at station B.

The rammer arm 17 normally occupies the position shown in full lines in Fig. 1, but whenever necessary it may be swung clear of the table to the position shown by broken lines. A spring latch 65 is provided for holding the rammer arm in either one of these positions.

While I have described a preferred embodiment of my invention I wish it to be understood that this is to be taken as illustrative and not limitative, and I reserve the right to make various changes in form, construction, and arrangement of parts, that may be made without departing from the spirit and scope of the following claims.

I claim:

1. In a molding machine, a jarring mechanism comprising a vertically reciprocable head, a table mounted to rotate over said head and having a series of individually reciprocable portions adapted to be reciprocated by the head, each portion serving to support a mold to be jarred and a rammer adapted to press against the mold being jarred.

2. In a molding machine, a jarring mechanism comprising a vertically reciprocable head, a circular table mounted to rotate over said head and having a series of individually reciprocable sections adapted to be reciprocated by the head, each section serving to support a mold to be jarred, a rammer head adapted to rest on the mold during the jarring operation, and means operable at will for withdrawing the rammer head from the mold.

3. In a molding machine, a jarring mechanism comprising a vertically reciprocable head, a conveyor adapted to travel over said head and having a series of individually reciprocable portions adapted to be reciprocated by the head, each portion serving to support a mold to be jarred, a rammer head adapted to rest on the mold during the jarring operation, and means operable at will for withdrawing the rammer head from the mold.

4. In a molding machine, a jarring mechanism comprising a reciprocable jarring head, a conveyor movable over the head, plates carried by the conveyor and individually reciprocable thereon by the jarring head, each plate serving as a support for a pattern and a flask section, and means for retaining the pattern and flask section against lateral displacement during the jarring operation.

5. In a molding machine, a jarring mechanism comprising a reciprocable jarring head, a conveyor over the head, plates carried by the conveyor and individually reciprocable thereon by the jarring head, each plate serving as a support for a pattern and a flask section, means for guiding each plate in its reciprocating movement, and means for retaining the pattern plate and flask against lateral displacement on the plate while permitting vertical movement with respect to the plate.

6. In a molding machine, a jarring mechanism comprising a reciprocable jarring head, a conveyor movable over the head, plates carried by the conveyor and individually reciprocable thereon by the jarring head, a pattern plate for a flask section, each pattern plate having a centering socket, a centering pin on each conveyor plate adapted to fit into such socket, each conveyor plate being also formed with slots, and pins carried by the pattern plate adapted to engage such slots and the flask to hold the flask and pattern against lateral displacement on the conveyor plate.

7. In a molding machine, a jarring mechanism comprising a reciprocable jarring head, a conveyor movable over the head, plates carried by the conveyor and individually reciprocable thereon by the jarring head, a pattern plate, a flask section overlying the pattern plate, the latter having a centering socket, a centering pin on each conveyor plate adapted to engage such socket, each conveyor plate being also formed with slots, and pins carried by the flask and passing through the pattern plate into such slots.

8. In a molding machine, a jarring mechanism, a stripper, and a rotary table adapted to carry a series of molds sequentially to the jarring mechanism and thence over the stripper, said table having plates on which the molds are supported, the plates being adapted for vertical reciprocation by the jarring mechanism and being also formed with slots under the mold, the stripper being formed with pins adapted to be projected through said slots to strip the mold.

9. In a molding machine, a jarring mechanism, a stripper, and a conveyor for carrying a series of molds sequentially to the jarring mechanism and thence over the stripper, said conveyor having plates on which the molds are supported, the plates being adapted for vertical reciprocation by the jarring mechanism and being also formed with slots under the mold, the stripper being formed with pins adapted to be projected through said slots to strip the mold.

10. In a molding machine, a jarring mechanism, a stripper, a rotary table adapted to carry molds from the jarring mechanism to the stripper, and means on the table for positioning the molds at predetermined angular spacing thereon, the jarring mechanism and stripper being so relatively positioned that while one mold is in position to be stripped by the stripper the succeeding mold on the table will be in position to be jarred by the jarring mechanism.

11. In a molding machine, a jarring mechanism having a vertically reciprocable jarring head, a stripper having vertically movable stripping pins, a circular table mounted to rotate over the head and stripping pins, said table having vertically movable plates individually reciprocable by the jarring head and adapted to support molds, the plates being also slotted whereby the stripper pins may pass through the table to strip the molds, the jarring mechanism and stripper being so relatively disposed that one mold may be stripped while another is being jarred.

12. In a molding machine, a conveyor, a series of pattern plates mounted thereon at uniform spacing along the conveyor, the latter being movable to carry the plates step by step through a series of stations of corresponding spacing, a jarring and ramming mechanism at one of the stations, and a stripper at a succeeding station, wherein a flask section may be fited upon each pattern as it stops at a station preceding the jarring station and the flask section be filled with sand, and simultaneously a pattern with its sand filled flask section at the jarring station may be jarred to pack and ram the mold, while at the same time the mold at the stripper station may be stripped from its pattern and be removed from the conveyor.

13. In a molding machine, a rotary table provided with a series of reciprocable sections disposed at uniform angular spacing, a pattern plate mounted on each section, the table being movable to carry the plates step by step through a cycle of stations of angular spacing, a jarring mechanism at one of the stations, and a stripper at a succeeding station, whereby a flask section may be fitted upon each pattern as it stops at a station preceding the jarring station and the flask section be filled with sand, and simultaneously a pattern and sand filled flask section at the jarring station may be jarred, while at the same time the mold at the stripper station may be stripped from its pattern and removed from the table.

JOHN J. LAWLOR.